(12) United States Patent
Butler et al.

(10) Patent No.: US 8,055,129 B2
(45) Date of Patent: Nov. 8, 2011

(54) ALIEN WAVELENGTH CHANNEL BALANCING AND LINE AMPLIFIER OPTIMIZATION

(75) Inventors: David Butler, Richardson, TX (US); Lev B. Sofman, Allen, TX (US)

(73) Assignee: Alcatel Lucent, Paris (FR)

( * ) Notice: Subject to any disclaimer, the term of this patent is extended or adjusted under 35 U.S.C. 154(b) by 775 days.

(21) Appl. No.: 12/116,480

(22) Filed: May 7, 2008

(65) Prior Publication Data
US 2009/0279888 A1 Nov. 12, 2009

(51) Int. Cl.
*H04B 10/00* (2006.01)
*H04B 10/08* (2006.01)
*H04J 14/02* (2006.01)

(52) U.S. Cl. ............... 398/33; 398/37; 398/38; 398/94; 398/160

(58) Field of Classification Search ............... 398/9, 25, 398/33, 34, 37, 38, 147, 158–160, 93–95, 398/192–194, 196, 197
See application file for complete search history.

(56) References Cited

U.S. PATENT DOCUMENTS

| | | | |
|---|---|---|---|
| 7,123,834 B2 * | 10/2006 | Hullin et al. | 398/33 |
| 2002/0163683 A1 | 11/2002 | Antoniades et al. | |
| 2002/0191903 A1 * | 12/2002 | Neuhauser | 385/24 |
| 2003/0053163 A1 | 3/2003 | Li et al. | |
| 2006/0024063 A1 * | 2/2006 | Onaka et al. | 398/149 |
| 2006/0233552 A1 | 10/2006 | Eder et al. | |

FOREIGN PATENT DOCUMENTS

| | | |
|---|---|---|
| EP | 0924888 A | 6/1999 |
| WO | 2006/008321 A | 1/2006 |

OTHER PUBLICATIONS

ISR and Written Opinion for Intl. Appl. No. PCT/US2009/002031 mailed Aug. 17, 2009.

* cited by examiner

*Primary Examiner* — Dalzid Singh
(74) *Attorney, Agent, or Firm* — Garlick Harrison & Markison (57) ABSTRACT

An algorithm is disclosed for performing alien-wavelength channel balancing on channels between optical network elements within an optic-fiber communications system. The algorithm determines initial values of various optimization parameters for each of the channels, such as the input launch power and operating conditions of optical amplifiers in the optical path, and calculates an initial total optimization offset for the channels based on the initial values of the optimization parameters for each of the channels. The algorithm then adjusts the optimization parameters to new values and calculates a new total optimization offset based on the new optimization parameter values. The algorithm repeats this process until the relative channel launch powers and optical amplifiers are optimized.

21 Claims, 4 Drawing Sheets

ALIEN WAVELENGTH CHANNEL BALANCING AND LINE AMPLIFIER OPTIMIZATION

BACKGROUND OF THE INVENTION

1. Technical Field of the Invention

The present invention relates in general to communication systems, and in particular, to wavelength division multiplexing (WDM) fiber-optic communication systems.

2. Description of Related Art

In fiber-optic communication systems, wavelength-division multiplexing (WDM) is commonly used to multiplex multiple optical carrier signals (channels) onto a single optical fiber by using different wavelengths (colors) of laser light to carry different signals. Traditionally, the only optical interfaces available on equipment connected to the client side of WDM transmission equipment were not wavelength-controlled and were only suitable for short reach transmission. However, router vendors are increasingly adding dense WDM (DWDM) long reach interfaces as options on their products. The availability of these client side DWDM interfaces has led to a demand for "alien wavelength" transport over WDM transmission equipment, i.e. the direct connection of the third party DWDM optical signal to the transmission equipment optical multiplexer.

The optimum line operating conditions and relative channel powers need to be determined on systems carrying these alien wavelengths. On WDM long haul systems employing transponders from only one vendor, the optimum signal levels through the line together with the optimum channel powers could be determined by accessing the pre FEC error counters at the far end transponders. However, when transporting alien wavelengths, the WDM signals may be generated and received by equipment supplied by other manufacturers, and it is generally not practical to access the third party equipment pre FEC error counters.

Transmitting all channels at the same power is an adequate solution in metro/regional systems when all the channels have similar transmission characteristics. However, there is increasingly a need to support OC-48, OC-192, OC-768 and 100 GbE simultaneously within one system. A variety of modulation formats exist for transporting these signals, each with there own transmission requirements. Therefore, a need exists for automatically optimizing a line and adjusting the relative channel powers to obtain the best possible performance in a system carrying different traffic types originating from a multitude of different manufacturers equipment.

SUMMARY OF THE INVENTION

Embodiments of the present invention provide a method for performing alien-wavelength channel balancing on channels between optical network elements within an optic-fiber communications system. The method determines initial values of various optimization parameters for each of the channels, such as the input launch power and operating conditions of optical amplifiers along an optical fiber between the optical network elements. In addition, the method calculates an initial total optimization offset for each of the channels based on the initial values of the optimization parameters for each of the channels. The method then makes small adjustments to the optimization parameters and calculates a new total optimization offset based on the new optimization parameter values. The method repeats the steps of adjusting and calculating until the new total optimization offset is greater than the previous optimization offset. When the new total optimization offset is greater than the previous optimization offset, the method sets the optimization parameters to the previous values, which results in the optimization of the channel launch power and optical amplifiers for each of the channels.

In a further embodiment, if the new total optimization offset is greater than the initial optimization offset, the method first determines if adjustments to the optimization parameters have been made in both adjustment directions before setting the optimization parameters to the previous values. If not, the method reverses the adjustment direction while repeating the steps of adjusting and calculating the new total optimization offset until the new total optimization offset is greater than the previous optimization offset and both adjustment directions have been completed.

In an exemplary embodiment, the step of calculating the initial values for the performance parameters further includes estimating a respective optical signal to noise ratio (OSNR) for each of the channels and estimating a respective total integrated channel launch power for each of the channels. The method also determines a maximum integrated power for each of the channels and a minimum OSNR for each of the channels. To calculate the total optimization offset, the method calculates the difference between the total integrated channel launch power and the maximum integrated power to determine a respective power difference for each of the channels, calculates the difference between the calculated OSNR and the minimum OSNR to determine a respective OSNR difference for each of the channels, calculates the difference between the power difference and the OSNR difference to determine a respective optimization offset for each of the channels and integrates the respective optimization offset for each of the channels to determine the total optimization offset.

In another exemplary embodiment, the operating condition of each of the optical amplifiers is a respective gain of the optical amplifiers, and the step of adjusting further includes adding respective offsets to the respective input launch power for each of the channels and the respective gains of each of the optical amplifiers for each of the channels. For example, in one embodiment, each of the offsets is determined by multiplying a scaling factor having a value less than one by a random number between −1 and +1 to generate a random number as the offset. In yet a further embodiment, the scaling factor progressively decreases in size with successive iterations of the step of adjusting.

Embodiments of the present invention further provide an apparatus for performing alien-wavelength channel balancing on channels between optical network elements within an optic-fiber communications system. The apparatus includes means for determining respective initial values of optimization parameters for each of the channels, in which the optimization parameters include at least a respective input launch power for each of the channels and respective operating conditions of optical amplifiers along an optical fiber between the optical network elements. The apparatus further includes means for calculating an initial total optimization offset for the channels based on the respective initial values of the optimization parameters for each of the channels, means for adjusting the optimization parameters to respective new values, means for calculating a new total optimization offset based on the respective new values, means for repeating the steps of adjusting and calculating until the new total optimization offset is greater than a previous optimization offset determined using previous values of the optimization parameters and means for setting the optimization parameters to the previous values when the new total optimization offset is greater than the previous optimization offset.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
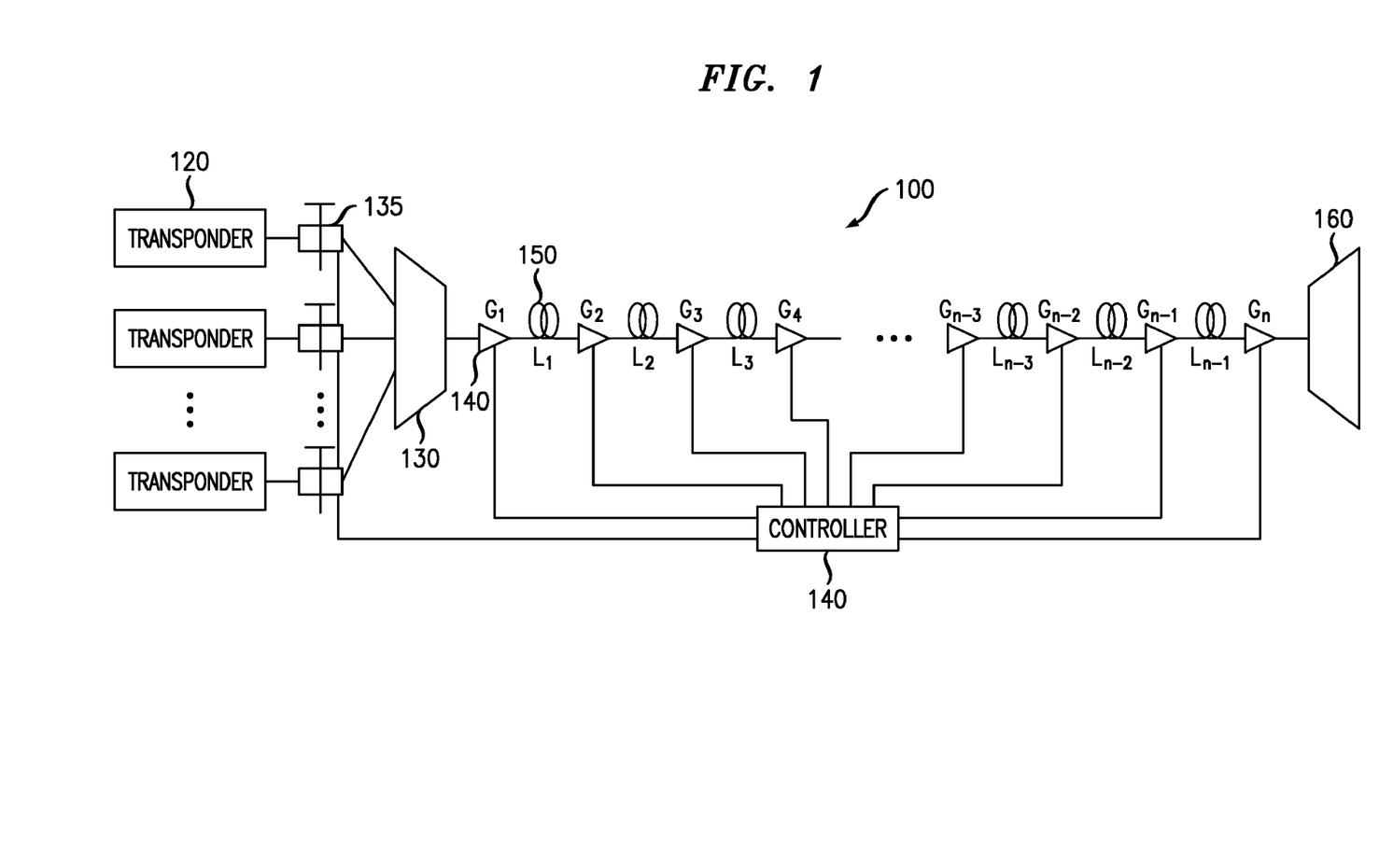
FIG. 1 is a block diagram illustrating an exemplary fiber-optic communication system for performing alien wavelength channel balancing and line amplifier optimization in accordance with embodiments of the present invention.

FIG. 1 illustrates an exemplary fiber-optic communication system 100 configured to perform the alien-wavelength channel balancing algorithm of the present invention. The fiber-optic communication system 100 includes a plurality of optical transponders 120, each supplied by a third party manufacturer. Thus, each optical transponder 120 is operable to transmit and/or receive a respective alien wavelength optical signal. As used herein, the term "alien wavelength" refers to optical signals generated and/or received by third party equipment. The alien wavelength optical signals from all of the optical transponders 120 are fed into an optical multiplexer 130 that combines and multiplexes the optical signals from each of the optical transponders 120 onto a single optical fiber that includes one or more fiber spans 150 and one or more optical amplifiers 140.

Each fiber span 150 may be on the order of 40-60 km in length for long-haul networks or may be any other suitable length for use in transmitting optical signals in the optic-fiber communications system 100. Each optical amplifier 140 may be, for example, a rare-earth-doped fiber amplifier (REDFA), such as erbium-doped fiber amplifiers (EDFAs), or other type of amplifier for amplifying the optical signal. In addition, each optical amplifier 140 may be operated in either constant-gain mode or constant-power mode.

The multiplexed optical signal is received at an optical demultiplexer 160 that demultiplexes the optical signals and provides the demultiplexed optical signals to additional optical transponders (not shown). The optical path taken by each optical signal from near-end optical transponder 120 to far-end optical transponder is referred to herein as the optical channel. Each optical channel is carried on a different optical carrier wavelength and is modulated at a particular data rate. For example, the carrier wavelengths used may be within the C-band (1530 nm to 1565 nm) as well as the L-band (1565 nm to 1635 nm), and the channels may be modulated at data rates from 2.5 Gbps (OC-48) to 40 Gbps (OC-768). However, the present invention is not limited to any particular wavelength, group of wavelengths or data rate. In general, the carrier wavelength of any particular channel may be in the range of 1240 nm-1670 nm.

In addition, the number of channels provided by the optic-fiber communications system 100 is not limited to any particular number of channels. For example, the optic-fiber communications system 100 may include only two channels or hundreds of channels, depending on the capacity requirements of the system 100. Furthermore, the number of optical amplifiers 140 used is not limited to any particular number of optical amplifiers 140.

However, as the number of optical amplifiers 140 increases, the cumulative effect of the variations in gain and amplified spontaneous emission (ASE) noise applied to each of the optical channels by the optical amplifiers 140 increases. As a result, the output spectrum may vary widely in optical signal-to-noise ratio (OSNR) and power levels between the optical channels. Therefore, in accordance with embodiments of the present invention, an alien wavelength channel balancing algorithm is performed to adjust the relative input power launch levels (transponder output power levels) and operating conditions of the optical amplifiers 140 of the channels until all of the associated outputs have nearly the same OSNR with optical power levels that satisfy the dynamic range requirements of the far-end optical transponders.

The alien-wavelength channel balancing algorithm of the present invention is implemented using a controller 110 coupled to the optical multiplexer 130 and to the optical amplifiers 140 between the optical multiplexer 130 and optical demultiplexer 160 of the optic-fiber communications system 100. The controller 110 includes any device, system or part thereof that controls execution of the channel balancing algorithm and adjustment of the input power levels of the channels. The controller 110 can be implemented in hardware, software, firmware, or some combination thereof. It should be noted that the functionality associated with the controller 110 may be centralized or distributed, whether locally or remotely.

The controller 110 operates to monitor the performance of each of the optical amplifiers 140 by estimating the OSNR and total integrated power ($\propto$ to nonlinear penalty) for each channel. Based on the OSNR and total integrated power for each channel, the controller 110 further operates to optimize both the optical amplifiers 140 and relative channel launch powers to achieve the best performance for all of the channels. In particular, the controller 110 is operable to adjust the channel input power levels of each of the channels by adjusting respective attenuators 135 coupled between the transponders 120 and the optical multiplexer 130. Each attenuator 135 is associated with one of the transponders 120, and therefore, controls the input power of each channel provided to the optical multiplexer 130.

To accurately estimate the OSNR and total integrated power for each channel, the controller 110 initially measures and calibrates out the differences in insertion loss for each channel through the optical multiplexer 130. For example in one embodiment, the controller 110, with knowledge of the channel multiplexer input powers, can compare the channel input powers to the output of a channel power monitor (not shown) coupled to the output of the optical multiplexer 130. In another embodiment, the channel monitor can be positioned at a different point in the optic-fiber communications system 100, and the controller 110 can calibrate out the insertion loss differences based on measurements taken at that point.

Once the difference in insertion loss between the channels has been calibrated out, the controller 110 can estimate the OSNR and total integrated power of each of the channels. For example, as shown in FIG. 1, assuming that the first amplifier 140 in the line has a linear gain of $G_i$ and linear noise figure $NF_i$ at the channel wavelength and the optical fiber span 150 coupled to that first amplifier 140 has linear loss $L_i$, the channel power at the output of the last amplifier can then be approximated by:

$$Pch = P_{launch} \prod_{i=1}^{n} [L_i G_i], \quad \text{(Equation 1)}$$

where $P_{launch}$ is the channel power out of the optical multiplexer 130. In addition, the corresponding noise for each channel at the output of the last amplifier can be approximated by:

$$ASE_n = h\nu\Delta\nu(G_n NF_n - 1) + ASE_{n-1} G_n L_{n-1}, \quad \text{(Equation 2)}$$

where h is Planck's constant, v is the channel optical frequency and $\Delta\nu$ is the noise measurement bandwidth. The optical signal to noise ratio, OSNR, for each channel may therefore be estimated at the end of the line as:

$$OSNRlinear_n = \frac{P_{ch}}{ASE_n} \quad \text{(Equation 3)}$$

The total integrated channel launch power of each channel can also be estimated by:

$$IntegratedPower_{linear} = \sum_{i=1}^{n} P_i, \quad \text{(Equation 4)}$$

where $P_i$ is the channel power at the output of amplifier i.

Transmission performance parameters, such as the required OSNR ($OSNR_{min}$) and maximum total integrated power (Integrated Power$_{max}$), are generally available for each type of alien wavelength transponder. Therefore, the optimum performance in logarithmic units for each channel is achieved when:

IntegratedPower$_{max}$−IntegratedPower=OSNR−OSNR$_{min}$. (Equation 5)

It should be understood that, although not shown, an additional term may be added to Equation 4 to account for the difference in bit error rate (BER) sensitivity to changes in OSNR and total integrated power.

Therefore, with knowledge of the $OSNR_{min}$ and Integrated Power$_{max}$, an optimization offset for each channel can be calculated from:

OptimizationOffset=|(IntegratedPower$_{max}$−IntegratedPower)−(OSNR−OSNR$_{min}$)|, (Equation 6)

and the total optimization offset for all of the channels in linear units can be calculated as:

$$TotalOptimizingOffset = \sum_{i=1}^{n} OptimizingOffsetlinear_i \quad \text{(Equation 7)}$$

The controller 110 operates to minimize the sum total optimization offset of all of the channels to achieve the best performance for all channels. The controller 110 minimizes the total optimization offset by adjusting the amplifier 140 gains and the channel launch powers by making adjustments to attenuators 135.

Figure 2:
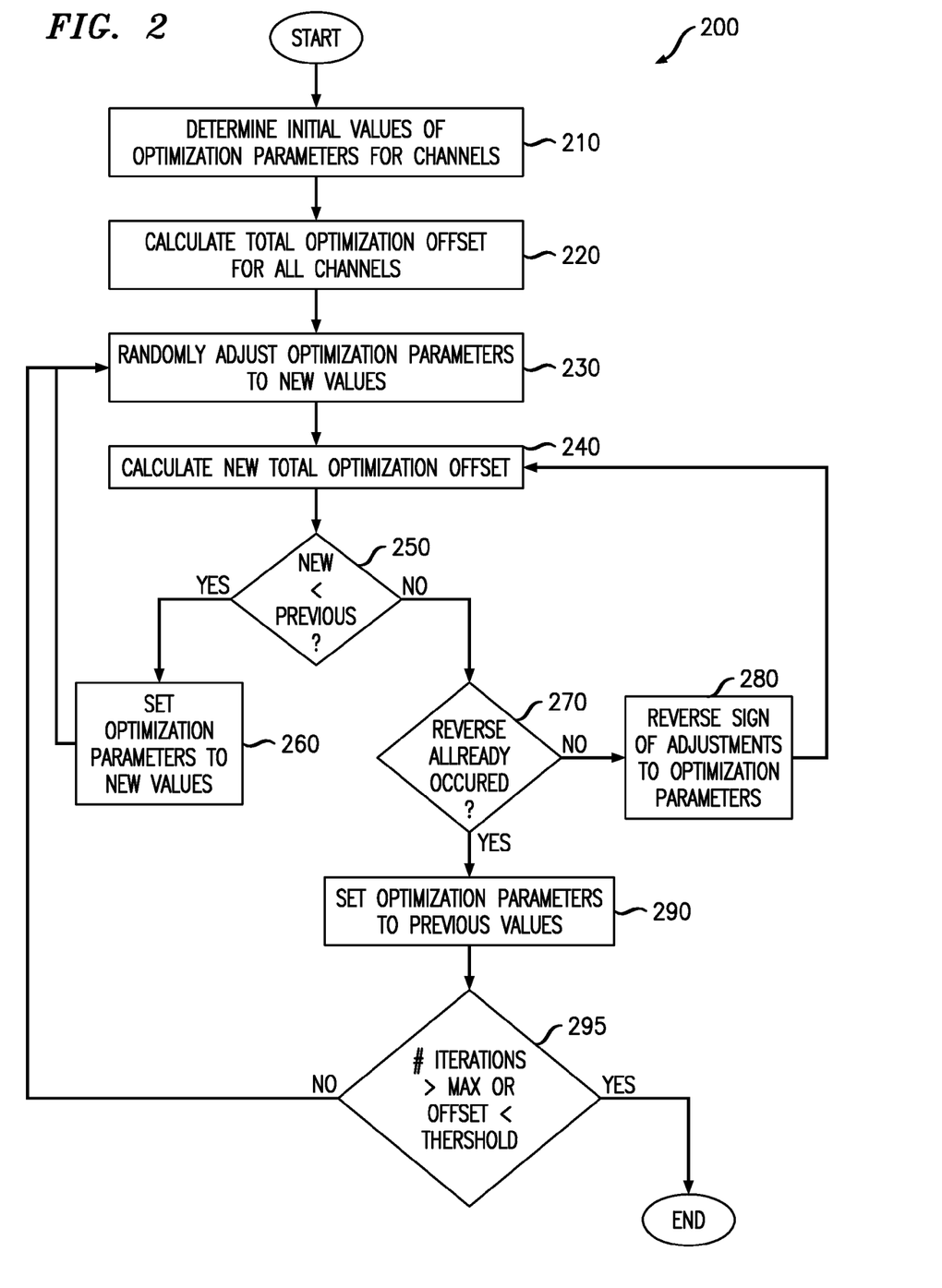
FIG. 2 is a flowchart illustrating an exemplary process for performing alien wavelength channel balancing, in accordance with embodiments of the present invention.

FIG. 2 is a flowchart illustrating an exemplary process 200 for performing alien wavelength channel balancing, in accordance with embodiments of the present invention. The process begins at step 210, where initial values of various optimization parameters for all channels are determined. By way of example, but not limitation, the optimization parameters can include the launch power of each channel and the operating condition (e.g., gain) of each optical amplifier. The initial values of these optimization parameters are determined by either measuring these parameters or assigning them initial arbitrary values. Based on the initial values of the optimization parameters, at step 220, an initial total optimization offset is then calculated for all channels using, for example, Equations 1-7 above.

At step 230, the optimization parameters are randomly adjusted to new values. For example, in one embodiment, a respective offset is added to each of the initial amplifier gains and initial channel launch powers. Based on the new values of the optimization parameters, at step 240, a new value for the total optimization offset is calculated. If, at step 250, the new total optimization offset is less than the initial total optimization offset, then at step 260, the values of the amplifier gains and channel powers are changed to the values calculated with the added offsets and the process is repeated at step 230.

However, if the new total optimization offset is greater than the initial (or previous) optimization offset, at steps 270 and 280, the process is repeated at step 240, but with offsets having the opposite sign being added to each of the optimization parameters. Once the new total optimization offset is greater than the previous optimization offset after offsets having the opposite sign have been added to each of the optimization parameters, at step 290, the optimization parameters are set to the values calculated with the immediately previous added offsets. This process is repeated at step 295 until the number of iterations reaches a predetermined limit or the optimization offset falls below a predetermined threshold.

Figures 3, 3A:
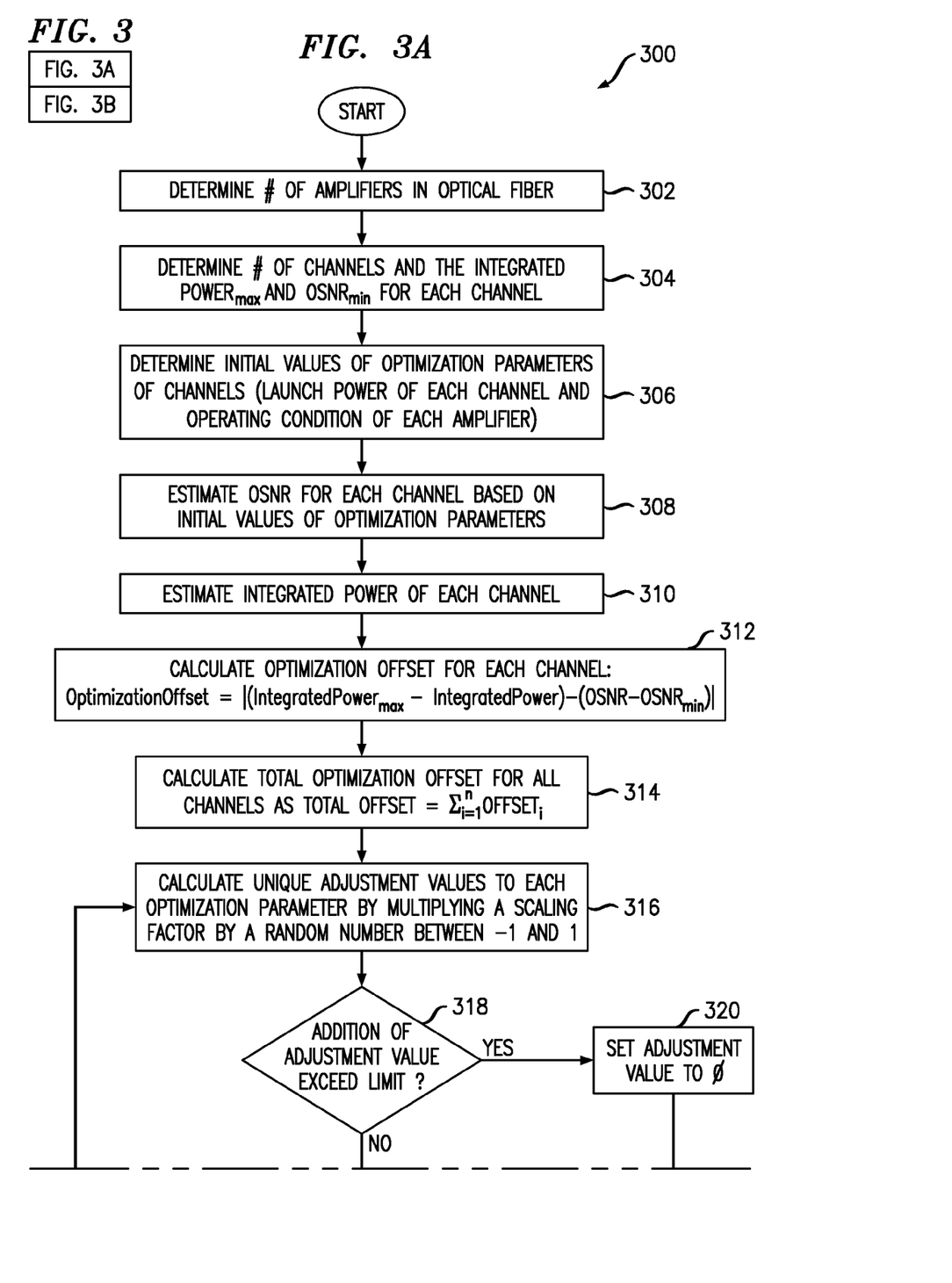
FIGS. 3A and 3B are flowcharts illustrating a more detailed exemplary process for performing alien wavelength channel balancing and line amplifier optimization, in accordance with embodiments of the present invention.
Figure 3B:
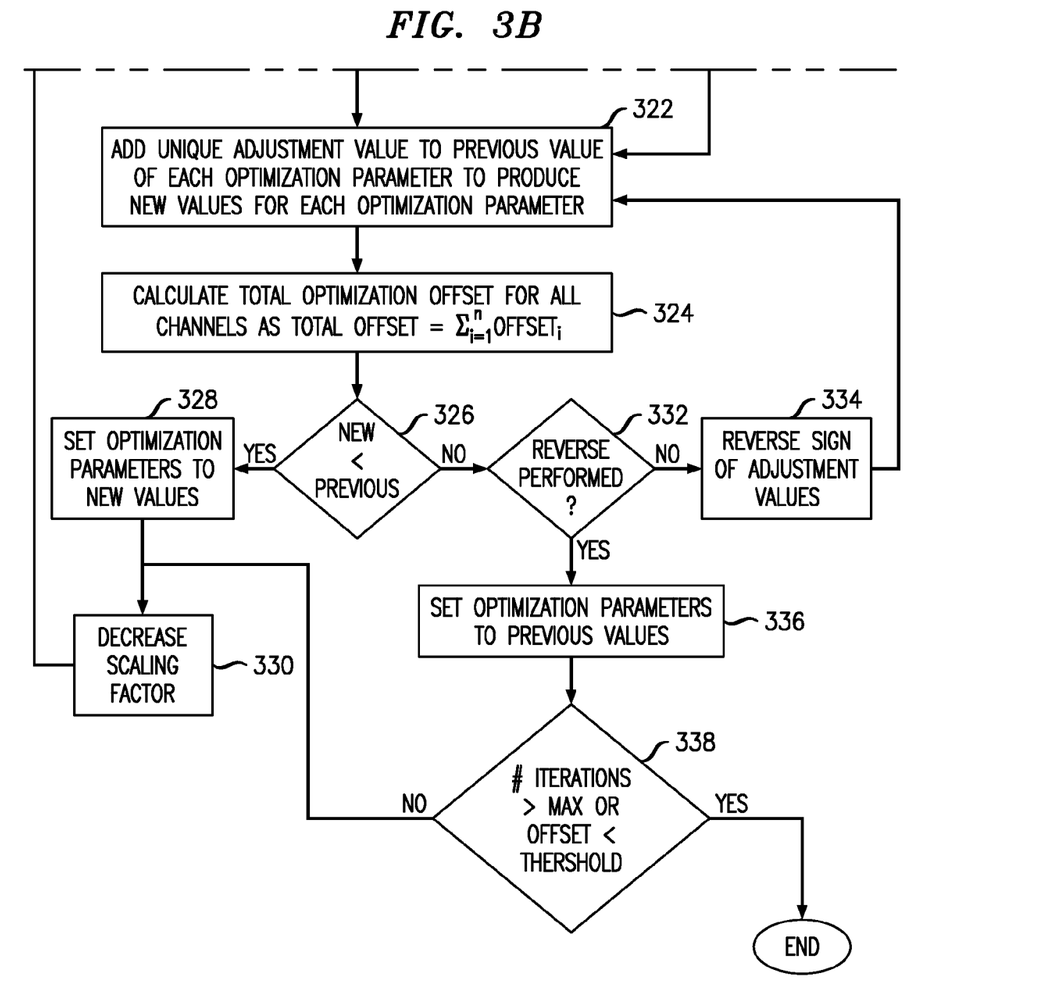

A more detailed process for performing the alien wavelength channel balancing process 300 will now be described in connection with FIGS. 3A and 3B. Initially, at steps 302 and 304, the number of optical amplifiers in the optical fiber, the number of channels and the minimum OSNR and maximum integrated power for each channel are determined. Thereafter, at step 306, the initial values of the optimization parameters (e.g., launch power of each channel and operating condition of each amplifier) for all channels are determined. Based on the initial values of the optimization parameters, at steps 308 and 310, the OSNR and integrated power of each channel is estimated, using, for example, Equations 1-4 above.

At step 312, the optimization offset for each channel is calculated as in Equation 6, which is reproduced herein below:

OptimizationOffset=|(IntegratedPower$_{max}$−IntegratedPower)−(OSNR−OSNR$_{min}$)|, From the optimization offsets for each channel, at step 314, the total sum initial optimization offset is calculated.

Once the initial optimization parameter values have been determined and the initial total optimization offset has been calculated, at step 316, unique adjustment values (offsets) are calculated for each optimization parameter. For example, in one embodiment, each offset can be calculated by multiplying a scaling factor by a random number between −1 and +1, thereby generating a different random number for each optimization parameter. If, at step 318, the addition of the offset to the initial value of a particular optimization parameter causes that parameter to exceed a limit (i.e., exceed a minimum or maximum amplifier gain or channel power), at step 320, the offset for that particular optimization parameter is set to 0.

Thereafter, at step 322, the unique offset for each optimization parameter are added to the initial (or previous) value of that optimization parameter to produce new values for each of the optimization parameters. At step 324, a new value for the total sum optimization offset is calculated as the sum of new individual channel optimization offsets based on the new optimization parameter values. If, at step 326, the new total optimization offset is less than the initial total optimization offset, then at step 328, the values of the amplifier gains and channel powers are changed to the values calculated with the added offsets, the scaling factor is decreased at step 330 and the process is repeated at step 316. Thus, the scaling factor used to calculate the unique offset values progressively decreases in size with successive iterations.

However, if the new total optimization offset is greater than the initial (or previous) optimization offset, at steps 332 and 334, the process is repeated at step 322, but with offsets having the opposite sign being added to each of the optimization parameters. Once the new total optimization offset is greater than the previous optimization offset after offsets having the opposite sign have been added to each of the optimization parameters, at step 336, the optimization parameters are set to the values calculated with the immediately previous added offsets. This process is repeated at step 338 until the number of iterations reaches a predetermined limit or the optimization offset falls below a predetermined threshold.

Although not shown, it should be noted that the alien wavelength channel balancing algorithm may further take into account PMD, residual dispersion penalty, ROADM filtering penalties, non-optimum dispersion map penalties and other factors not specifically mentioned herein.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A method for performing alien-wavelength channel balancing on channels between optical network elements within an optic-fiber communications system, said method comprising:

determining, by a controller, respective initial values of optimization parameters for each of the channels, the optimization parameters including at least a respective input launch power for each of the channels and respective operating conditions of optical amplifiers along an optical fiber between the optical network elements;

calculating an initial total optimization offset for the channels based on the respective initial values of the optimization parameters for each of the channels;

adjusting the optimization parameters to respective new values;

calculating a new total optimization offset based on the respective new values;

repeating the steps of adjusting the optimization parameters and calculating the new total optimization offset is less than the previous optimization offset determined using previous values of the optimization parameters; and setting the optimization parameters to the new values when the new total optimization offset is less than the previous optimization offset.

2. The method of claim 1, wherein the step of repeating further includes:

determining if the new total optimization offset is greater than the initial optimization offset, if not, setting the respective new values of the optimization parameters as the respective previous values and the new total optimization offset as the previous optimization offset, repeating the step of adjusting by adjusting optimization parameters from the respective previous values to respective new values, repeating the step of calculating the new total optimization offset and repeating the step of determining by determining if the new total optimization offset is greater than the previous optimization offset, if so, determining if adjustments to the optimization parameters have been made in both adjustment directions, if not, reversing the adjustment direction while repeating the steps of adjusting the optimization parameters from the respective previous values to respective new values, calculating the new total optimization offset and determining if the new total optimization offset is less than the previous optimization offset, if so, setting the optimization parameters to the new values.

3. The method of claim 1, wherein the steps of calculating the initial total optimization offset and the new total optimization offset each further include:

calculating initial values for performance parameters from the initial values of the optimization parameters;

determining operating limits of the performance parameters;

calculating the total optimization offset as the combined difference between the initial values and the operating limits of the performance parameters.

4. The method of claim 3, wherein the step of calculating the initial values for the performance parameters further includes:

estimating a respective optical signal to noise ratio (OSNR) for each of the channels; and estimating a respective total integrated channel launch power for each of the channels.

5. The method of claim 4, wherein the step of estimating the respective OSNR for each of the channels further includes:

approximating a respective channel power for each of the channels at the output of a last one of the optical amplifiers along the optical fiber based on the respective input launch power for each of the channels;

approximating a respective noise for each of the channels at the output of the last optical amplifier based on the respective operating conditions of the optical amplifiers along the optical fiber; and estimating the respective OSNR for each of the channels as the ratio of the respective channel power to the respective noise.

6. The method of claim 5, wherein the step of approximating the respective channel power for each of the channels further includes:

determining a respective gain for each of the optical amplifiers along the optical fiber for each of the channels;

determining a respective linear loss for the optical fiber between each of the optical amplifiers for each of the channels;

multiplying all of the respective gains and the respective linear losses together to determine a respective power factor for each of the channels; and multiplying the respective power factor with the respective input launch power for each of the channels to approximate the respective channel power for each of the channels.

7. The method of claim 5, wherein the step of approximating the respective noise for each of the channels further includes:
  determining a respective gain ($G_i$) and respective linear noise figure ($NF_i$) associated with each of the optical amplifiers for each of the channels;
  determining a respective linear loss ($L_i$) for the optical fiber between each of the optical amplifiers for each of the channels; and
  for each of the channels, computing the respective noise ($ASE_n$) using the equation:

$$ASE_n = h\nu\Delta\nu(G_n NF_n - 1) + ASE_{n-1} G_n L_{n-1},$$

where h is Planck's constant, $\nu$ is the optical frequency of the respective channel and $\Delta\nu$ is the bandwidth of the respective optical channel.

8. The method of claim 4, wherein the step of estimating the respective total integrated channel launch power for each of the channels further includes:
  for each of the channels, integrating the channel power at the output of each of the optical amplifiers to estimate the total integrated channel launch power.

9. The method of claim 4, wherein the step of determining the operating limits of the performance parameters further includes:
  determining a maximum integrated power for each of the channels; and
  determining a minimum OSNR for each of the channels.

10. The method of claim 9, wherein the steps of calculating the total optimization offset further include:
  for each of the channels, calculating the difference between the total integrated channel launch power and the maximum integrated power to determine a respective power difference;
  for each of the channels, calculating the difference between the calculated OSNR and the minimum OSNR to determine a respective OSNR difference;
  for each of the channels, calculating the difference between the power difference and the OSNR difference to determine a respective optimization offset; and
  integrating the respective optimization offset for each of the channels to determine the total optimization offset.

11. The method of claim 1, wherein the operating condition of each of the optical amplifiers is a respective gain of the optical amplifiers, and wherein the step of adjusting further includes:
  adding respective offsets to the respective input launch power for each of the channels and the respective gains of each of the optical amplifiers for each of the channels.

12. The method of claim 11, wherein the step of adding further includes:
  for each of the offsets, multiplying a scaling factor having a value less than one by a random number between −1 and +1 to generate a random number as the offset.

13. The method of claim 12, wherein the scaling factor progressively decreases in size with successive iterations of the step of adjusting.

14. An apparatus for performing alien-wavelength channel balancing on channels between optical network elements within an optic-fiber communications system, said apparatus comprising:
  means for determining respective initial values of optimization parameters for each of the channels, the optimization parameters including at least a respective input launch power for each of the channels and respective operating conditions of optical amplifiers along an optical fiber between the optical network elements;
  means for calculating an initial total optimization offset for the channels based on the respective initial values of the optimization parameters for each of the channels;
  means for adjusting the optimization parameters to respective new values;
  means for calculating a new total optimization offset based on the respective new values;
  means for repeating the steps of adjusting and calculating until the new total optimization offset is less than the previous optimization offset determined using previous values of the optimization parameters; and
  means for setting the optimization parameters to the new values when the new total optimization offset is less than the previous optimization offset.

15. The apparatus of claim 14, wherein the means for repeating further includes:
  means for determining if the new total optimization offset is greater than the initial optimization offset,
    if not, means for setting the respective new values of the optimization parameters as the respective previous values and the new total optimization offset as the previous optimization offset, repeating the step of adjusting by adjusting optimization parameters from the respective previous values to respective new values, repeating the step of calculating the new total optimization offset and repeating the step of determining by determining if the new total optimization offset is greater than the previous optimization offset,
    if so, means for determining if adjustments to the optimization parameters have been made in both adjustment directions,
      if not, means for reversing the adjustment direction while repeating the steps of adjusting the optimization parameters from the respective previous values to respective new values, calculating the new total optimization offset and determining if the new total optimization offset is less than the previous optimization offset,
      if so, means for setting the optimization parameters to the new values.

16. The apparatus of claim 14, wherein the means for calculating the initial total optimization offset and the means for calculating the new total optimization offset each further include:
  means for estimating a respective optical signal to noise ratio (OSNR) for each of the channels;
  means for estimating a respective total integrated channel launch power for each of the channels;
  means for determining a minimum OSNR and a maximum integrated power for each of the channels;
  means for calculating the difference between the estimated total integrated channel launch power and the maximum integrated power to determine a respective power difference for each of the channels;
  means for calculating the difference between the estimated OSNR and the minimum OSNR to determine a respective OSNR difference for each of the channels;
  means for calculating the difference between the power difference and the OSNR difference to determine a respective optimization offset for each of the channels; and
  means for integrating the respective optimization offset for each of the channels to determine the total optimization offset.

17. The apparatus of claim 16, wherein the means for estimating the respective OSNR for each of the channels further includes:

means for approximating a respective channel power for each of the channels at the output of a last one of the optical amplifiers along the optical fiber based on the respective input launch power for each of the channels;

means for approximating a respective noise for each of the channels at the output of the last optical amplifier based on the respective operating conditions of the optical amplifiers along the optical fiber; and means for estimating the respective OSNR for each of the channels as the ratio of the respective channel power to the respective noise.

18. The apparatus of claim 17, wherein the means for approximating the respective channel power for each of the channels further includes:

means for determining a respective gain for each of the optical amplifiers along the optical fiber for each of the channels;

means for determining a respective linear loss for the optical fiber between each of the optical amplifiers for each of the channels;

means for multiplying all of the respective gains and the respective linear losses together to determine a respective power factor for each of the channels; and means for multiplying the respective power factor with the respective input launch power for each of the channels to approximate the respective channel power for each of the channels.

19. The apparatus of claim 17, wherein the means for approximating the respective noise for each of the channels further includes:

means for determining a respective gain ($G_i$) and respective linear noise figure ($NF_i$) associated with each of the optical amplifiers for each of the channels;

means for determining a respective linear loss ($L_i$) for the optical fiber between each of the optical amplifiers for each of the channels; and for each of the channels, means for computing the respective noise ($ASE_n$) using the equation:

$$ASE_n = hv\Delta v(G_n NF_n - 1) + ASE_{n-1} G_n L_{n-1},$$

where h is Planck's constant, v is the optical frequency of the respective channel and $\Delta v$ is the bandwidth of the respective optical channel.

20. The apparatus of claim 14, wherein the means for adjusting further includes:

for each of the operating parameters, multiplying a scaling factor having a value less than one by a random number between −1 and +1 to generate a random number as a respective offset; and means for adding the respective offset to the respective operating parameter for each of the channels.

21. The apparatus of claim 20, wherein the scaling factor progressively decreases in size with successive iterations of the means for adjusting.

* * * * *